United States Patent [19]
Lewis et al.

[11] Patent Number: 5,684,861
[45] Date of Patent: Nov. 4, 1997

[54] APPARATUS AND METHOD FOR MONITORING CELLULAR TELEPHONE USAGE

[76] Inventors: Walter F. Lewis, 10271 Meadowood, Overland, Mo. 63114; Michael J. McGovern, 309 Rotunda Ct., St. Charles, Mo. 63303; Jay W. Van Dwingelen, 13020 Big Bend Rd., Kirkwood, Mo. 63122

[21] Appl. No.: 566,786

[22] Filed: Dec. 4, 1995

[51] Int. Cl.$^6$ .................. H04M 11/00; H04M 15/00
[52] U.S. Cl. .................. 379/59; 379/58; 379/114
[58] Field of Search .................. 379/59, 58, 62, 379/111–115, 130–133, 144; 455/33.1

[56] References Cited

U.S. PATENT DOCUMENTS

| | | | |
|---|---|---|---|
| 5,109,401 | 4/1992 | Hattori et al. | 379/62 |
| 5,233,642 | 8/1993 | Renton | 379/59 |
| 5,285,494 | 2/1994 | Sprecher et al. | 379/59 |
| 5,291,543 | 3/1994 | Freese et al. | 379/59 |
| 5,297,192 | 3/1994 | Gerszberg | 379/59 |
| 5,315,638 | 5/1994 | Mukari | 379/58 |
| 5,321,735 | 6/1994 | Breeden et al. | 379/58 |
| 5,361,297 | 11/1994 | Ortiz et al. | 379/59 |
| 5,404,391 | 4/1995 | Wavroch et al. | 379/59 |
| 5,420,914 | 5/1995 | Blumhardt | 379/114 |
| 5,550,897 | 8/1996 | Seiderman | 379/144 |
| 5,577,100 | 11/1996 | McGregor et al. | 379/58 |
| 5,602,907 | 2/1997 | Hata et al. | 379/114 |

*Primary Examiner*—Dwayne Bost
*Assistant Examiner*—Tracy M. Legree
*Attorney, Agent, or Firm*—Polster, Lieder, Woodruff & Lucchesi

[57] ABSTRACT

A small, wireless, battery operated monitoring apparatus is provided that is installed by a user on a cellular telephone in close proximity to a telephone antenna. The monitoring device monitors telephone usage by detecting and tracking radio frequency signal transmissions from the antenna to a base station. The monitoring device includes a microprocessor that performs functions on data indicative of cellular telephone usage and the customer billing plan. The microprocessor, under control of a call processing program, determines exactly when cellular mobile service is established and terminated at the cellular telephone. Under control of a time tracking program, the microprocessor monitors telephone usage, and generates statistical information indicative of telephone usage. The tracking program allows the user to set parameter values associated with statistical information indicative of a customer billing plan and the current date and time. The microprocessor maintains and updates the statistical information, as necessary. The current parameter values for the statistical information generated by the microprocessor are selectively displayed on a display unit associated with the monitoring device. The monitoring device can be used with any manufacturer's cellular telephone, and works with any cellular telephone system standard in the United States or abroad. An alternative embodiment of the present invention allows for the monitoring device to be incorporated into the standard electrical circuitry associated with a cellular telephone such that at least a portion of the monitoring apparatus is contained within the housing of the mobile unit. A method for monitoring telephone usage is also disclosed.

37 Claims, 3 Drawing Sheets

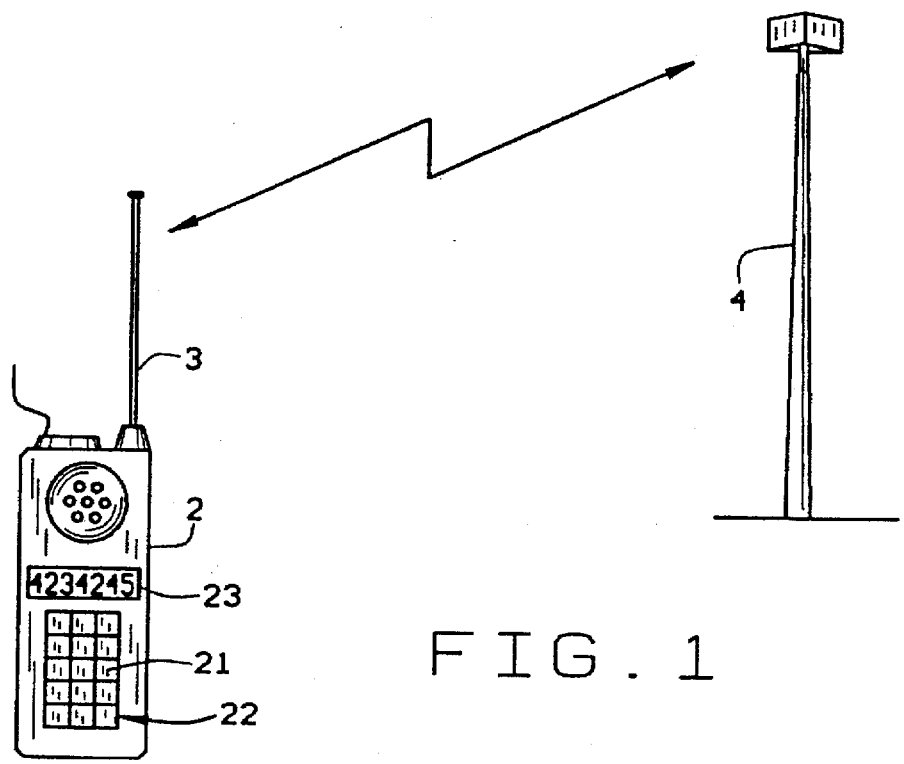
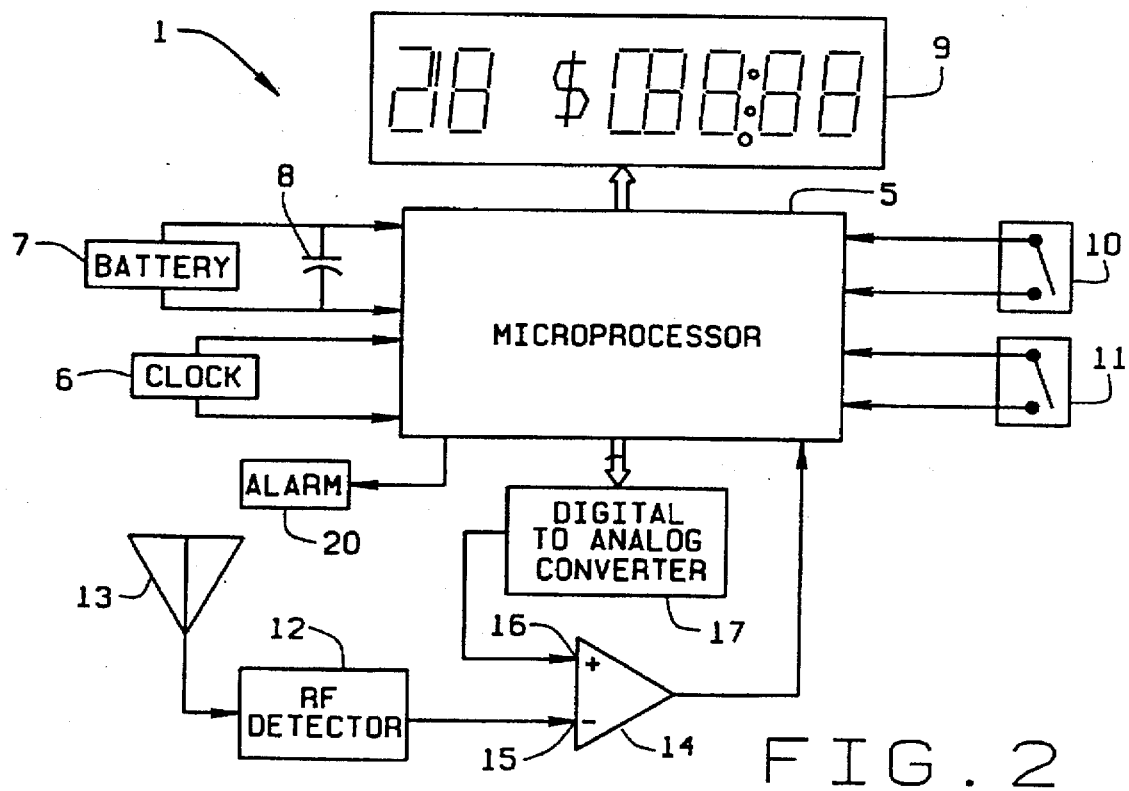

| FUNCTION CODES | STATISTICAL INFORMATION | FUNCTION DESCRIPTION |
|---|---|---|
| P | 12:59 | DISPLAY PEAK TIME USED OR FREE TIME REMAINING |
| 0 | 12:59 | DISPLAY OFF-PEAK TIME USED OR FREE TIME REMAINING |
| 1 | $19999 | DISPLAY COST (PEAK+OFF PEAK+CONNECT TIME) FOR CURRENT BILLING PERIOD |
| 2 | $19999 | DISPLAY ESTIMATED BILL FOR ENTIRE BILLING PERIOD |
| 3 | 12:59 | DISPLAY PEAK TIME USED DURING LAST BILLING PERIOD |
| 4 | 12:59 | DISPLAY OFF-PEAK TIME USED DURING LAST BILLING PERIOD |
| 5 | $19999 | DISPLAY TOTAL COST FOR LAST BILLING PERIOD |
| 6 | 12:59 A/P | SET/DISPLAY CURRENT TIME |
| 7 | 12 31 | SET/DISPLAY CURRENT MONTH, DAY OF MONTH |
| 8 | SU 7 | SET/DISPLAY CURRENT DAY OF WEEK (MO...SU) AND NUMERIC CODE (1...7) |
| 9 | 1995 | SET/DISPLAY CURRENT YEAR |
| 10 | SU 7 | SET/DISPLAY PEAK START DAY (MO...SU) AND NUMERIC CODE (1...7) |
| 11 | SU 7 | SET/DISPLAY PEAK END DAY (MO...SU) AND NUMERIC CODE (1...7) |
| 12 | 12:59 A/P | SET/DISPLAY PEAK START TIME |
| 13 | 12:59 A/P | SET/DISPLAY PEAK END TIME |
| 14 | $199.99 | SET/DISPLAY PEAK RATE (CURRENCY PER MINUTE) |
| 15 | $199.99 | SET/DISPLAY OFF-PEAK RATE (CURRENCY PER MINUTE) |
| 16 | $199.99 | SET/DISPLAY CONNECT TIME RATE (CURRENCY PER MINUTE) |
| 17 | 12:59 | SET/DISPLAY FREE PEAK HOURS/MINUTES |
| 18 | 12:59 | SET/DISPLAY FREE OFF-PEAK HOURS/MINUTES |
| 19 | 31 | SET/DISPLAY START BILLING DAY OF MONTH |
| 20 | 2 | SET/DISPLAY CELLULAR SYSTEM TAPE |
| 21 | 9999 | SET LOCK-OUT CODE |

FIG. 4

APPARATUS AND METHOD FOR MONITORING CELLULAR TELEPHONE USAGE

BACKGROUND OF THE INVENTION

This invention relates generally to wireless communications systems and, more specifically, to a method and apparatus for monitoring and displaying current and cumulative usage data for cellular mobile telephone service provided during a billing period.

The use of cellular telephones has increased dramatically over the last few years. Subscribers to cellular telephone service generally are billed for the time the telephone is in use. Novel or creative billing packages are employed by the cellular service providers as marketing tools.

Often the billing packages include a combination of rates. For example, the service may offer unlimited free off-peak time, limited free off-peak, reduced rates for different times of the day, graduated rates based upon volume usage and so forth. It will be appreciated that regardless of the billing package employed, the telephone user has a keen interest in tracking the amount of time the telephone is in use, for obvious reasons.

Most cellular telephones have a simple built-in timer that indicates the duration of the last call or the total usage since the timer was last reset. These simple timers are of little utility to the user who wishes to track his or her monthly peak or off-peak usage. The user may want to track the total number of peak minutes used in a given billing period. Likewise, the user may want to track the usage in terms of total dollars rather than minutes of air time. With primitive timers, the user may receive an unexpectedly large bill at the end of the month.

The user also may want to track the remaining balance of free minutes. For example, the user may forego using the telephone at certain times of the day for fear of going over budget when, in reality, the user still has unused free or reduced rate time available in the billing period.

In other applications, the owner of the cellular telephone may want to bill a third party for use of the telephone. For example, if the telephone is rented on a short term basis or mounted in a rental car the owner of the telephone would benefit from a quick and accurate readout of total time the phone was in use or total charges incurred by the use of the phone. U.S. Pat. No. 5,233,642, to Renton, describes a device for this type of application. Although the device provides details of each call, it suffers from a number of drawbacks. First, it only operates with its own specific built-in cellular transceiver. It is not interchangeable between phones. It cannot be attached to and transported along with a portable phone. Furthermore, it requires an outside power source and is wired to the cellular transceiver. The Renton device does not display statistical usage information to the user and cannot report actual dollar usage.

There are more than one dozen types of cellular telephone systems in use worldwide. These systems operate at various radio frequencies. For example, these systems include the AMPS (Advanced Mobile Phone Service) system in use in the United States, Canada, Australia and elsewhere. The AMPS system uses mobile to base station frequencies of 825 to 845 MHz. The TACS (Total Access Coverage Service) system is used in the United Kingdom, United Arab Emirates, China and elsewhere and employs mobile to base station frequencies of 890 to 915 MHz. The NMT-450 (Nordic Mobile Telephone) system is in use in France, Switzerland, Saudi Arabia and elsewhere and uses mobile to base station frequencies of 453 to 457.5 MHz. It would be a great advantage to have a device that monitors telephone usage at these various frequencies.

Most cellular telephone systems are analog in nature. The voice signal is modulated directly onto a continuous RF carrier. A single subscriber uses each RF channel for the duration of the telephone call. There are, however, emerging digital cellular standards in which the voice signal is first digitized then transmitted in digital form on an RF carrier which is discontinuous, i.e., the carrier is turned on only periodically, occupying a short time slice which has been dynamically assigned. Such systems include IS-54-B, a digital cellular standard, currently in limited use in the United States, and which transmits discontinuously with a 33.3% duty cycle. IS-95-A, a digital standard, is to be implemented in the United States in 1996 and transmits discontinuously with a 12.5% duty cycle. Finally, GSM, a digital standard, currently in use in Europe, transmits discontinuously with a 12.5% duty cycle. Any device that would monitor cellular phone usage should be able to monitor analog and digital telephone systems.

Furthermore, it will be appreciated that all cellular telephone systems automatically adjust their RF power levels as required by local conditions. Any device used to monitor cellular phone usage should be able to dynamically adjust its input sensitivity. The ability to adjust its input sensitivity would allow the device to ignore unwanted nearby RF signal sources by adjusting to the level of sensitivity needed under the conditions. The lowest power level necessary for telephone call detection under any of the cellular telephone systems is −22 dBm (6.3 milliwatts).

In summary, no device is presently available that is wireless or built directly into a cellular telephone for monitoring cellular telephone usage that can monitor peak, off-peak and connect time or which can display usage in terms of dollars, minutes of peak or off-peak time used or remaining. There is no device that can keep track of totals for a user's monthly billing period or save information from a previous month's use or bill. Furthermore, there is no device available that can be used with any cellular phone, that can adjust its RF detection sensitivity or can be used with various mobile unit systems.

SUMMARY OF THE INVENTION

Accordingly, it is among the principal objects of the present invention to provide a device for the detailed monitoring and display of cellular telephone usage.

It is another object of the present invention to provide such a device that can report the cellular telephone usage in a number of categories including total connect time, peak time used, off-peak time used, unused peak and off-peak time remaining.

Still another object of the present invention is to provide such a device that stores monthly totals.

Yet another object of the invention is to provide such a device that can employs a broad band antenna and RF detection circuit which allows it to be used with any cellular telephone system.

Another object of the invention is to provide such a device that can be used with analog and digital cellular telephone systems.

A still further object of the invention is to provide such a device that is wireless and can be retrofitted to any cellular telephone transceiver.

Another object of the invention is to provide such a device that is economical to manufacture, incorporates a simple long-life battery for power, is easy to install and well suited for its intended purposes.

A further object of the invention is to provide a device for detailed monitoring and display of cellular telephone usage that can be incorporated into the standard electrical circuitry associated with a cellular telephone such that at least a portion of the device is contained within the housing of the cellular telephone.

These and other objects will become apparent to those skilled in the art in light of the following disclosure and accompanying drawings.

In accordance with the invention, generally stated, an apparatus is disclosed for monitoring when a cellular telephone is used for mobile cellular communications that includes detection means for detecting the presence of a telephone call from the cellular telephone. A programmable control means tracks the duration and time of day associated with the telephone call. The apparatus also includes means for manually inputting data into the data processing means indicative of terms of a customer billing package and current date and time. The control means maintains and updates the data, and generates statistical information based upon the data and the duration and time of day of the telephone call. Display means is provided for selectively displaying statistical information and a function code representative of a particular function performed by the control means in generating the displayed statistical information. A power source is provided for supplying power to the control means.

Another aspect of the present invention is of a device for monitoring usage of a cellular telephone based upon RF signal transmissions from an antenna associated with the cellular telephone that includes detection means for detecting the presence of RF signal transmissions from the cellular telephone, and generating an output signal representative of transmitted RF signals. Data processing means is operatively connected to the detection means. The data processing means generates a reference signal having a preselected magnitude. The data processing means tracks the duration and timing of the output signal generated by the detection means having a magnitude greater than or equal to the magnitude of the reference signal for a period of time exceeding a predetermined time interval. The data processing means performs input, processing, storage, output and control functions to accomplish a sequence of operations on data stored therein, and to generate statistical information indicative of cellular telephone usage based upon RF signal transmissions from the cellular telephone. Means is provided for manually inputting data into the data processing means. Display means displays one of a plurality of function codes representative of a particular function performed by the data processing means in generating the displayed statistical information and the statistical information associated with the displayed function code. Means is provided for selectively viewing any one of the plurality of function codes and associated statistical information by manually advancing the statistical information and function code displayed on the display means. A power source supplies power to the data processing means.

Still another aspect of the present invention is that of a wireless monitoring device for monitoring when a cellular telephone is used for mobile cellular telephone service. The device includes an RF detection circuit including a broadband antenna coupled to an antenna associated with the cellular telephone for detecting RF signal transmission from the telephone antenna, and generating an analog output voltage proportional to transmitted RF signals. A microprocessor is provided for controlling the operation of the monitoring device and processing data indicative of usage of the cellular telephone. The microprocessor includes call processing means for determining whether the cellular telephone is in use, and time tracking means for monitoring duration and timing of the telephone call. The microprocessor generates a digital output signal that is supplied to a digital to analog (D/A) converter. The D/A converter generates an analog reference voltage that is proportional to the digital output signal generated by the microprocessor having a threshold voltage level at or above which the voltage level of the output voltage generated by the RF detection circuit must be maintained for the monitoring device to consider the cellular telephone to be in use. An analog comparator has a first input coupled to the output voltage generated by the RF detection circuit and a second input coupled to the analog reference signal generated by the D/A converter. The comparator generates a digital output signal having a first state when the first input is less than the second input, and a second state when the first input is greater than or equal to the second input. The output signal generated by the comparator is supplied to the microprocessor. A clock is coupled to the microprocessor for generating a clock pulse to provide for synchronization of functions performed by the microprocessor. A display unit allows for individually displaying a plurality of parameter values stored in the microprocessor corresponding to data processed by the microprocessor. First user actuated switching means is connected to the microprocessor for incrementally varying displayed parameter values. Second user actuated switching means is also connected to the microprocessor for advancing the displayed parameter values to the next parameter value stored in the microprocessor. A power source is provided for supplying power to the microprocessor.

Yet another aspect of the present invention is that of a method for monitoring the duration and timing of RF signal transmissions from a cellular phone during a cellular telephone call, comprising the steps of:

manually setting the current day of the week, day of the month, month and year;

detecting the presence of RF signal transmissions from a cellular telephone;

generating a first signal representative of RF signal transmissions;

generating a variable reference signal having a minimum threshold voltage level;

determining whether the first signal is maintained at a voltage level greater than or equal to the minimum threshold voltage level for a first predetermined time interval;

triggering a second predetermined time interval when the first signal is maintained at the voltage level greater than or equal to the minimum threshold voltage level for the first predetermined time interval;

establishing the presence of a telephone call from the cellular telephone when RF signal transmissions are detected after the expiration of the second time interval;

monitoring the duration and timing of the cellular telephone call;

generating statistical information indicative of usage of the cellular telephone based upon the manually set parameter values and the duration and timing of all telephone calls made from the cellular telephone during a predetermined time interval;

displaying statistical information on a visual display;

triggering a third predetermined time interval when RF signal transmissions are not detected after the expiration of the second time interval;

continuing to monitor the duration and timing of the cellular telephone call when RF signal transmissions are detected after the expiration of the third time interval; and terminating the telephone call when RF signal transmissions are not detected after the expiration of the third time interval.

Other objects and features will be apparent and in part pointed out hereinafter.

BRIEF DESCRIPTION OF THE DRAWINGS

The objects of the invention are achieved as set forth in the illustrative embodiments shown in the drawings which form a part of the specification.

FIG. 1 is a front plan view of a cellular telephone with a wireless monitoring device of the present invention mounted thereon, the cellular telephone shown in relation to a local cellular base station to illustrate environment;

FIG. 2 is a block diagram illustrating the hardware architecture in the monitoring device of the present invention;

FIG. 4 is a list of the display functions of the monitoring device of the present invention.

Corresponding reference characters indicate corresponding parts throughout the several views of the drawings.

DESCRIPTION OF THE PREFERRED EMBODIMENT

Figure 3:
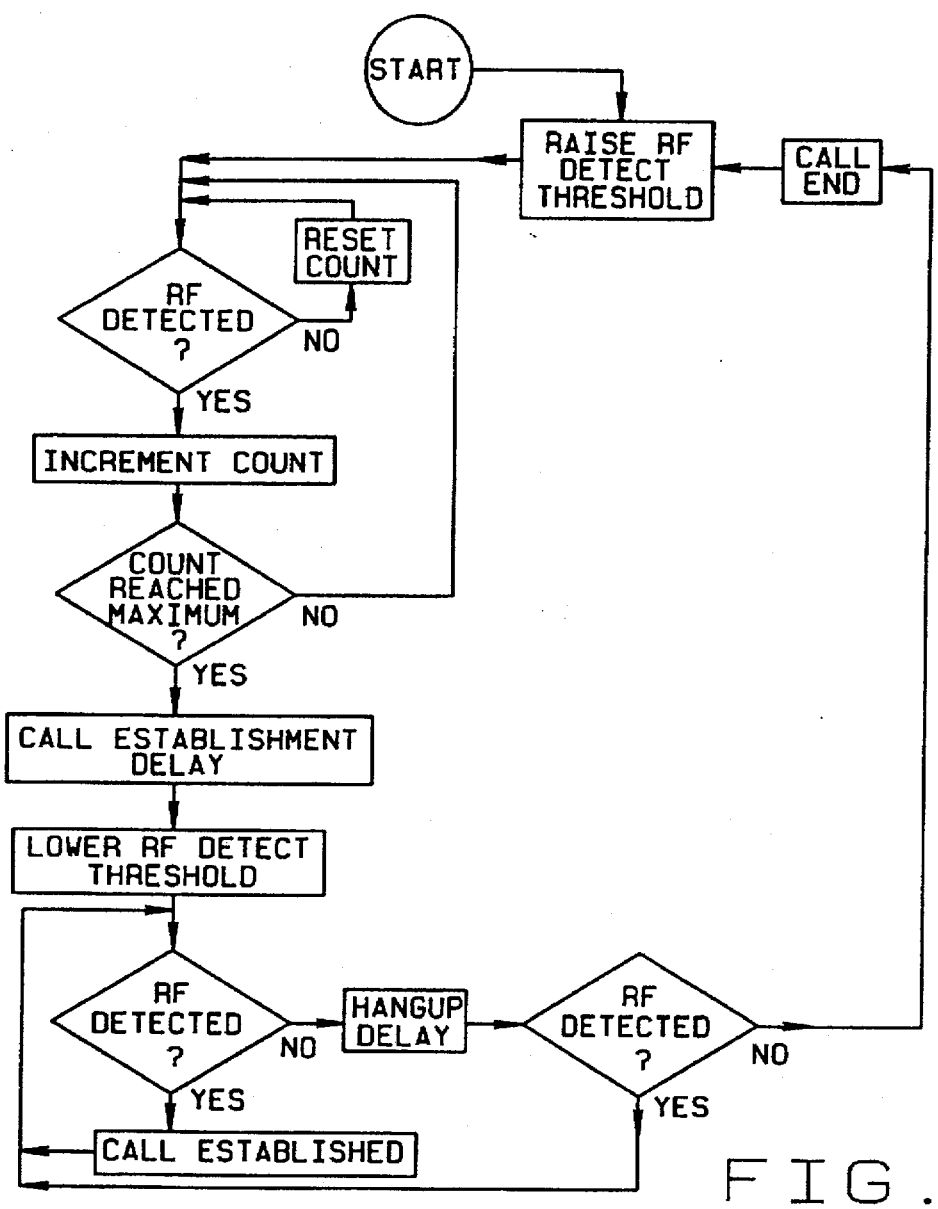
FIG. 3 is a flow diagram illustrating the functions performed by the logic module for RF detection.

Referring now to FIG. 1, there is shown a monitoring device, indicated generally at 1, attached to a conventional cellular mobile telephone or mobile unit 2 in close proximity to a cellular telephone antenna 3 associated with the mobile unit 2. The mobile unit 2 communicates by two-way radio with a local cellular base station 4. The monitor 1 detects and monitors radio frequency (RF) transmission from the mobile unit 2 to the base station 4.

FIG. 2 best illustrates the internal electrical circuitry and hardware of monitor 1. Monitor 1 employs a controller or microcontroller which acts as a data processing device by performing a plurality of input, processing, storage, output and control functions to accomplish a sequence of operations on data indicative of cellular telephone usage and the terms of a customer billing plan that is stored in the controller. The controller is preferably a microprocessor 5 operating under programmed control as shown in FIG. 2. Certain microprocessor functions are controlled by either a call processing program or a time tracking program stored in the microprocessor 5. The microprocessor 5, under control of the call processing program, determines exactly when cellular mobile telephone service is established and terminated at the mobile unit 2 (see FIG. 3). Under control of the time tracking program, the microprocessor monitors the telephone usage, and generates statistical information indicative of telephone usage such as total time used or available free of charge during specified time intervals (e.g., peak and off-peak time intervals) in a billing period, and the current total cost for total time used in a billing period based upon billing rates associated with specified time intervals and connection time. The time tracking program also allows the user to set parameter values for statistical information indicative of the terms of a particular billing plan or package to which the user subscribes (e.g., billing rates for different times of a day or week, billing period, connection time rates, amount of peak and off peak time available free of charge in a billing period). The user can also set parameter values for statistical information indicating the current day of the week, day of the month, month, year which the microprocessor 5 updates and maintains. As discussed below in greater detail, FIG. 4 sets forth a list of statistical information that can be generated by the microprocessor time tracking program when a user subscribes to a mobile cellular telephone service having a billing package with separate billing rates for peak time and off-peak time and a set amount of time available free of charge during peak and off-peak time for each billing period. It will be appreciated by those skilled in the art that the time tracking program easily can be altered to accommodate different billing plans having alternative billing schemes.

Synchronization of internal components associated with the microprocessor 5 is controlled by timing pulses generated by a clock 6 including a crystal oscillator. The clock 6 is used to control all internal timings, including the time of day and other calendaring functions. The clock 6 allows the microprocessor 5 to accurately determine the date and time at which a telephone call begins and ends.

At least one button cell battery 7 such as a standard watch battery supplies necessary power to the microprocessor 5, based upon the power requirements of the monitoring device 1. A capacitor 8 connected in parallel with the cell battery 7 functions as an energy storage element so that the microprocessor 5 retains stored statistical information, usage data and parameter settings during battery failure or replacement.

The microprocessor 5 drives a digital display 9 such as a liquid crystal display (LCD) that provides a digital readout of alphanumeric symbols representative of function codes and statistical information associated with various time tracking functions performed by the microprocessor 5. The function codes and statistical information associated with each function code are stored in the microprocessor 5. One function code and its associated statistical information are displayed on the display 9 at all times. As will be discussed in greater detail below, the microprocessor 5 automatically updates the statistical information associated with certain functions, when appropriate. The function code, shown on the left side of the display 9 in FIG. 2, indicates a particular time tracking function performed by the device 1 or a particular parameter setting that is used and maintained by the microprocessor in performing the time tracking functions. The statistical information, shown on the right side of the display 9 in FIG. 2, includes usage information indicative of the current parameter value of cellular telephone usage data associated with the displayed function code. The statistical information also includes information that does not directly reflect telephone usage data, such as the current time of day and the current day of week. This type of statistical information may be used by the microprocessor 5 to determine certain usage information. The monitoring device 1 can be programmed to monitor and display information associated with the use and operation of the mobile unit 2. FIG. 4 sets forth a list of possible function codes and statistical information that can be displayed on the digital display 9. FIG. 4 also includes a brief description of each function corresponding to a particular function code which will be discussed more fully below.

The monitoring device 1 also includes two manually operable push button switches, namely, a function switch 10 and a parameter value switch 11. Each switch 10, 11 has a normally open position and an actuated or closed position. The microprocessor 5 periodically examines the position of the switches 10, 11. When the function switch 10 is actuated, the microprocessor 5 changes or advances the displayed function code to the next function code stored in the microprocessor 5. Actuation of the parameter value switch 11 causes the microprocessor 5 to change (e.g., incrementally increase or decrease) the parameter value of the statistical information symbols shown on the display 9, when appropriate if the value is changeable. This allows the user to update the statistical information associated with various functions, e.g., changing the start date, changing the billing rate for peak or off-peak time or changing the current time.

Figure 5:
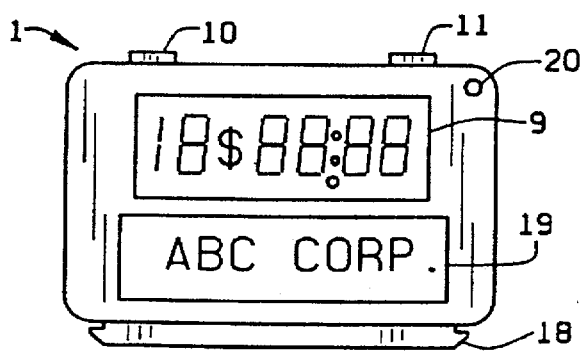
FIG. 5 is a top elevational view of the wireless monitoring device of the present invention.

The microprocessor 5 is responsive to RF signals transmitted from the telephone 2 to the cellular base station 4 via the antenna 3 associated with the mobile unit 2. The monitoring device 1 includes an RF detection circuit 12 having a broadband antenna 13 that is effectively coupled to the telephone antenna 3 to detect the presence of RF signal transmissions from the antenna 3. The detection circuit 12 is capable of detecting continuous or periodic RF signal transmissions so as to allow the monitoring device 1 to operate in conjunction with either analog or digital cellular telephones. The broadband antenna 13 has a compact design so that it is easily contained within the packaging (as shown in FIG. 5) of the monitoring device 1. The RF detection sensitivity is adjusted to the appropriate level needed under current conditions, thus allowing the monitor 1 to ignore unwanted nearby RF signal sources. When RF signal transmissions are detected by the antenna 13, the antenna 13 generates a RF signal proportional to the transmitted signal. The detection circuit 12 converts the RF signal to an analog voltage proportional to the RF signal level. In the preferred embodiment, the RF detection circuit 12 is capable of sensing the RF signals having power levels of −22 dBm (6.3 mW). The analog output signal of the RF detector 12 is presented to a first input 15 of an analog comparator 14.

A second input 16 of comparator 14 is operatively connected to the microprocessor 5 via a digital to analog (D/A) converter 17. More specifically, the microprocessor 5 controls RF signal detection sensitivity by generating a digital output signal that is supplied to the D/A converter 17. The D/A converter 17 generates an analog reference signal that is proportional to the digital output signal. The analog reference signal has a minimum threshold voltage level at or above which the output signal of the RF detection circuit 12 must be maintained before the microprocessor 5 performs any time tracking functions monitoring cellular telephone usage. The microprocessor 5 effectively adjusts the minimum threshold voltage level of the analog reference signal by varying its digital output signal, depending upon the type of cellular system employed and the timing of the call processing program and associated functions. The analog reference signal generated by the D/A converter 17 is then presented to the second input 16 of the comparator 14. The comparator 14 generates a binary output signal having a first state or voltage level and a second state or voltage level that is presented to the microprocessor 5.

The output signal of the comparator 14 is maintained in the first state when the voltage level of the output signal generated by the RF detection circuit 12 is less than the minimum threshold voltage level of the reference signal. In this situation, the mobile unit 2 is not in use and time tracking functions associated with the microprocessor are deactivated. When the voltage level of the RF signal is greater than or equal to the minimum threshold level, the output signal of the comparator 14 changes state so as to be maintained in the second state. As will be discussed in greater detail below with respect to FIG. 3, when the output signal is maintained in the second state for a predetermined time interval (call establishment delay period), the microprocessor 5, under the control of the call processing program, activates the time tracking program to monitor the time the mobile unit is in use. The time tracking program remain activated by the microprocessor 5 until the output signal of the comparator 14 changes to the first state for a predetermined time interval (hang-up delay period).

The call processing program for microprocessor 5 used in a TIA-553 (U.S. analog) cellular system is set forth in the flow chart shown in FIG. 3. The call processing program is activated immediately after the microprocessor 5 is reset when the cellular telephone 2 is turned on. The microprocessor 5, under the control of the call processing program, first increases the RF detection threshold level. The microprocessor 5 is programmed to periodically check the state of the RF detector 12 to determine whether an RF signal is being transmitted from the mobile unit 2. The microprocessor 5 then counts how many times the call processing program has detected the presence of an RF signal. If a predetermined maximum number of RF signals is detected, then a reliable RF signal is present, indicating the cellular telephone 2 is being used for mobile cellular telephone service.

The RF signal transmission from the mobile unit 2 requesting service and identifying the mobile unit 2 when power is turned on is known as a service request. Once the service request is transmitted from the mobile unit 2, the mobile unit 2 turns off its carrier frequency and goes into an await message mode, waiting on a reply from the base station 4. The cellular monitor then initiates a predetermined delay period referred to as a call establishment delay, which extends for the maximum time it might take the cellular base station to respond by assigning the initial frequencies to be used for signal transmission and reception, plus the time it takes for approximately four ringing tones to be emitted from the mobile unit 2. The time delay associated with the four ringing tones allows the mobile user time to hang up the phone before registering any time with the monitoring device 1. Beyond four rings, air time is typically charged to the cellular customer.

At the expiration of the call establishment delay, the microprocessor 5 lowers the RF detection threshold level. If the user hangs up prior to the expiration of the call establishment delay, then the RF signal is no longer detected by the RF detection circuit 12, and the call processing program activates a hang-up delay period which will be discussed below in greater detail. If the call goes through, the RF signal having a magnitude greater than or equal to the threshold level is detected by the RF detector 12 after the expiration of the call establishment delay such that the beginning of a call is established, and the monitoring device 1 begins tracking the time associated with the call by activating the time tracking program.

If the RF detector 12 fails to detect the presence of RF signal transmission after the expiration of the call delay or after a call is established, the microprocessor activates a hang-up delay period. The hang-up delay corresponds to a predetermined time interval that prevents premature termination of the time tracking functions associated with the microprocessor 5 by allowing for potential noise hits which may cause momentary losses of RF detection. If RF signal transmission is detected after the expiration of the hang-up delay, the microprocessor 5 continues monitoring the duration and timing of signal transmissions pursuant to the time tracking functions. If RF signal transmissions are not detected after the expiration of the hang-up delay period, the call ends and service is terminated to the mobile unit 2. The RF detection threshold level is then raised, and call processing begins again.

The cellular monitoring device 1, under the control of the time tracking program, constantly displays a function code and associated statistical information on the digital display 9. FIG. 4 sets forth a possible list of function codes, the format of the statistical information, and function descriptions used for a particular billing plan. Each function code is an alphanumeric character or set of characters that represent a time tracking function performed by the microprocessor 5 under control of the time tracking program. For example, function code "5" can be used to indicate the current time of day (see FIG. 4), or the phrase "TIME OF DAY" may be displayed as the function code. As mentioned above, the time tracking functions performed by the microprocessor 5 monitor the duration and timing of cellular telephone usage, and generate statistical information indicative of the usage of the cellular telephone 2. The function switch 10 allows the user to selectively display one of a plurality of function codes stored in the microprocessor 5, and the current parameter value of the statistical information associated with the displayed function code on the display 9. As mentioned above, when the user presses or actuates the function switch 10, the function code and statistical information displayed on the display 9 advances a different function code and associated statistical information maintained by the microprocessor 5.

Function code "P" or "o" is automatically displayed on the display 9 if the user has not actuated the function switch 10 or the parameter value switch 11 for a certain period of time. The "P" function code and associated statistical information is automatically displayed if the current time of day is within the designated peak period. Likewise, the "o" function code and associated statistical information is automatically displayed if the current time of day is outside the designated peak period (i.e., the off-peak period).

The time tracking function associated with the "P" function code calculates the current peak time used, or if a non-zero value was entered for the statistical information corresponding to function code 16 (Set/display free peak hours/minutes), the microprocessor 5 calculates the number of remaining free minutes. If all remaining free minutes have been consumed, and a non-zero value was entered for the statistical information corresponding to function code 13 (peak rate, cost per minute) then the microprocessor 5 is programmed to calculate total cost. If all remaining free minutes have been consumed, and a zero value was entered for the statistical information corresponding to function code 13 (peak rate, cost per minute) then the microprocessor 5 continues to calculate time, but the microprocessor 5 counts up instead of down, and flashes a visual alarm and/or sounds an audible alarm (referred to collectively as alarm 20). The display 9 shows the current parameter value for the associated statistical information when the "P" function code is displayed.

The microprocessor function associated with the "o" function code operates in a manner similar to the "P" function. The "o" function calculates the current off-peak time used, or if a non-zero value was entered for the statistical information associated with function code 17 (Set/display off-free peak hours/minutes), calculates the number of remaining free minutes. If all remaining free minutes have been consumed, and a non-zero value was entered for the statistical information associated with function code 14 (off-peak rate, cost per minute) then the microprocessor 5 calculates total cost. If all remaining free minutes have been consumed, and a zero value was entered for function 14 (off-peak rate, cost per minute) then the microprocessor 5 continues to calculate time, but counts up instead of down, and flashes the visual alarm and/or sounds the audible alarm 20. The display 9 shows the current parameter value for the statistical information calculated by the microprocessor 5 when the "o" function code is displayed.

The time tracking function associated with function code 1 calculates the current month's total cost to date, which includes peak, off-peak and connect charges. When function code 1 is displayed, the display 9 shows statistical information indicating the current month's total cost. If no rates were entered for peak, off-peak or connect time, then zero is displayed for the parameter value.

When function code 2 is displayed, the display 9 shows statistical information indicating the estimated total cost (bill) for the entire billing period based upon the rate of telephone usage to date.

When function code 3 is displayed, the display 9 shows statistical information indicating last month's total peak time used.

When function code 4 is displayed, the display 9 shows statistical information indicating last months off-peak time used.

When function code 5 is displayed, the display 9 shows statistical information indicating last months total cost, which includes peak, off-peak and connect charges. If no rates were entered for peak, off-peak or connect time, then zero is displayed.

When function code 6 is displayed, the display 9 shows statistical information indicating the current time of day. The user can actuate the parameter value switch 11 to change the current time of day, if desired.

When function code 7 is displayed, the display 9 shows statistical information indicating the current month and day of month. The user can actuate the parameter value switch 11 to change the current month and day, if desired.

When function code 8 is displayed, the display 9 shows statistical information indicating the current day of week (MO, TU, WE, TH, Fr, SA, SU) along with a numeric code (1 . . . 7) indicating the day of the week for the purpose of being foreign language compatible. The user can press the parameter value switch 11 to change the current day of the week and numeric code, if desired.

When function code 9 is displayed, the display 9 shows statistical information indicating the current year. This is used for determining leap years. The user can press the parameter value switch 11 to change the current year, if desired.

When function code 10 is displayed, the display 9 shows statistical information indicating the peak start day (MO, TU, WE, TH, Fr, SA, SU) along with a numeric code (1 . . . 7) indicating the day of the week. The user can actuate the parameter value switch 11 to change the peak start day, if desired.

When function 11 is displayed, the display 9 shows statistical information indicating the peak end day (MO, TU, WE, TH, Fr, SA, SU) along with a numeric code (1 . . . 7) indicating the day of the week. The user can press the parameter value switch 11 to change the peak end day, if desired.

When function code 12 is displayed, the display 9 shows statistical information indicating the peak start time of day. The user can actuate the parameter value switch 11 to change the peak start time, if desired.

When function code 13 is displayed, the display 9 shows statistical information indicating the peak end time of day. The user can actuate the parameter value switch 11 to change the peak end time, if desired.

When function code 14 is displayed, the display 9 shows statistical information indicating the peak rate in dollars and cents (or the corresponding local currency) per minute. The user can press the parameter value switch 11 to change the peak rate, if desired.

When function code 15 is displayed, the display 9 shows statistical information indicating the off-peak rate in dollars and cents (or the corresponding local currency) per minute. The user can press the parameter value switch 11 to change the off-peak rate, if desired.

When function code 16 is displayed, the display 9 shows statistical information indicating the connect time rate in dollars and cents (or the corresponding local currency) per minute. The user can actuate the parameter value switch 11 to change the connect time rate, if desired.

When function code 17 is displayed, the display 9 shows statistical information indicating the number of free peak hours/minutes. The user can press the parameter value switch 11 to change the number of free peak hours/minutes, if desired.

When function code 18 is displayed, the display 9 shows statistical information indicating the free off-peak hours/minutes. The user can press the parameter value switch 11 to change the number of free off-peak hours/minutes, if desired.

When function code 19 is displayed, the display 9 shows statistical information indicating the starting day of the month for the user's billing period. The user can press the parameter value switch 11 to change the starting day of the billing period, if desired.

When function code 20 is displayed, the display 9 shows statistical information indicating the type of cellular telephone system employed. As mentioned in the BACKGROUND OF THE INVENTION section, cellular telephone systems operate within various ranges of radio frequencies and power levels. This feature allows the monitoring device 1 to be used with any of the more than one dozen cellular telephone systems in use worldwide, such as AMPS, TACS, and NMT-450. The user can press the parameter value switch 11 to change the cellular system type, if desired.

The microprocessor function associated with function code 21 allows the user to set a lock-out code which locks out or prevents any changes to any parameters, until the same lock-out code is re-entered by the user. When function code 20 is displayed, the user has the option of changing the lock out code by pressing the parameter value switch 11.

FIG. 5 shows the preferred embodiment of the small, wireless, battery operated monitoring device 1 which can be quickly and easily mounted to the mobile unit 2 by the user. The overall dimensions of the monitor 1 in the preferred embodiment are approximately 1.3"×0.8"×0.4". The compact design of the monitor 1 allows the monitor 1 to fit unobtrusively on the cellular phone 2 near the telephone antenna 3. The monitoring device can be used with any manufacturer's cellular telephone, and works with any cellular telephone system standards in the United States or abroad. The monitor 1 can be attached to the mobile unit 2 in numerous fashions. For example, the monitor 1 can be attached to the mobile unit 2 with a hook and eye type fastener, double-sided sticky foam tape, tamper resistant fixtures or tamper indicators (for use with rental cellular telephones). The user can reference a slide-out card 18 (shown partially in phantom in FIG. 5) which lists the function codes and their corresponding function descriptions. A recessed rectangular area 19 allows for insertion of a logo or advertisement below the display 9. The monitoring device 1 can be employed in conjunction with both analog and digital mobile cellular telephone systems, and is programmable by the user to switch between the various system types (function code 19).

FIG. 5 also depicts the visual alarm 20 such as an LED light source which alerts the user when no time is available free of charge during peak and/or off-peak billing hours. Alternatively, the visual alarm can be incorporated into the display 9 such that an indicator appears on the display when the free time has been consumed. Similarly, the monitoring device can be configured so that the displayed function code and statistical information blink rapidly to provide a visual indication to the user in this situation. As mentioned above, an audible alarm can be provided in addition to or instead of the visual alarm. The audible alarm is driven by the microprocessor 5, and provides an audible warning to the user when no time is available free of charge during peak and/or off peak billing hours.

In an alternate embodiment of our present invention, the monitoring device 1 and associated microprocessor functions are incorporated directly into the mobile unit 2, thus eliminating the need for antenna 13, RF detection circuit 12, comparator 14, and D/A converter 17. In this situation, the microprocessor 5 is disposed within the housing of the cellular telephone, and is preferably representative of the controller or microprocessor typically associated with internal circuitry of the mobile unit. The microprocessor uses the standard detection circuitry associated with the mobile unit to determine when a signal is transmitted from the cellular telephone antenna. The controller or microprocessor of the mobile unit is programmed to perform the call processing functions and time tracking functions set forth above. Manually operable push button keys 21 associated with a key pad 22 of the cellular telephone can be used instead of push button switches 10 and 11 such that the controller or microprocessor is responsive to manual actuation of certain preselected keys 21. A digital display that is visible to the user such as the display 9 discussed above is used to provide a readout of the function codes and statistical information. In this situation, the display 16 can be a display 23 currently used on cellular telephones to display the number dialed. Furthermore, the power source can be a standard rechargeable battery typically associated with cellular telephones, such as a Ni—Cd battery. However, this alternate embodiment of our present invention may not be as desirable to mobile cellular telephone service providers as our wireless embodiment because of the problems associated with programming changes for the controller or microprocessor if the provider changes the billing plan.

The foregoing description is set forth for illustrative purposes only and is not meant to be limiting. Numerous variations, within the scope of the appended claims will be apparent to those skilled in the art in light of the foregoing description and accompanying drawings. For example, the monitoring device 1 can be used in conjunction with a remote antenna and RF detection circuit placed in close proximity to the remote antenna, such as may be the case with a window mounted antenna. In addition, the microprocessor 5 can be replaced with a random logic design. An audible alarm can be incorporated into the monitoring device to indicate when all free minutes have been consumed. A visual or audible alarm can also be provided for alerting the user when the cell battery needs to be replaced. The preferred embodiment monitors calls made during peak and off-peak hours since standard billing packages associated with mobile cellular phone service typically structure a customer's billing plan based on these usage patterns. However, the microprocessor 5 clearly can be programmed to accommodate alternative billing plans. For example, the monitoring device can track the time and cost associated with a billing plan having four billing rates corresponding to four periods of time for each day or week. Similarly, the monitoring device can monitor only total usage each day if a customer's billing plan does not make any distinctions between peak and off-peak hours.

Having thus described the invention, what is claimed and desired to be secured by Letters Patent is:

1. An apparatus for monitoring when a cellular telephone is used for mobile cellular telephone communication, comprising:

detection means for detecting the presence of a telephone call from the cellular telephone;

programmable control means for tracking the duration and time of day associated with the telephone call wherein said control means is contained within a housing that is manually mounted on a mobile unit in close proximity to an antenna associated with the mobile unit, said detection means detects the presence of RF signals transmissions from the antenna associated with the mobile unit indicative of the telephone call, and said control means tracks the duration and timing of RF signals detected by said detection means that have a magnitude maintained at a level greater than or equal to a minimum threshold level for at least a predetermined time interval;

means for manually inputting data into said control means indicative of terms of a customer billing plan and current date and time, said control means maintaining and updating the data, and generating statistical information based upon the data and the duration and time of day of the telephone call;

a display means for selectively displaying statistical information and a function code representative of a particular function performed by said control means in generating the displayed statistical information; and a power source for supplying power to said control means.

2. The apparatus as set forth in claim 1 wherein said control means is disposed within a mobile unit housing.

3. The apparatus as set forth in claim 2 wherein said means for manually inputting data corresponds to manually operable push buttons on a key pad associated with the mobile unit.

4. The apparatus as set forth in claim 1 wherein said display means is a liquid crystal display.

5. An apparatus for monitoring usage of a cellular telephone based upon radio frequency (RF) signal transmissions from an antenna associated with the cellular telephone, comprising:

detection means for detecting the presence of RF signal transmissions from the cellular telephone antenna, and generating an output signal representative of transmitted RF signals;

data processing means operatively connected to said detection means, said data processing means generating a reference signal having a preselected magnitude, said data processing means tracking the duration and timing of the output signal generated by said detection means having a magnitude greater than or equal to the magnitude of the reference signal for a period of time exceeding a predetermined time interval, said data processing means performing input, processing, storage, output and control functions to accomplish a sequence of operations on data stored therein, and generating statistical information indicative of cellular telephone usage based upon RF signal transmissions from the cellular telephone;

means for manually inputting data into said data processing means;

display means for displaying one of a plurality of function codes representative of a particular function performed by said data processing means in generating the displayed statistical information and the statistical information associated with the displayed function code;

means for selectively viewing any one of the plurality of function codes and associated statistical information displayed on the display means; and a power source for supplying power to said data processing means.

6. The monitoring apparatus as set forth in claim 5 further including comparison means for determining whether the output signal of the detection means has a magnitude greater than or equal to the magnitude of the reference signal, said comparison means having a first input receiving the output signal generated by said detection means and a second input receiving the reference signal generated by said data processing means, said comparison means generating an output signal maintained in a first state when the first input is less than the second input and in a second state when the first input is greater than or equal to the second input, the second state of the output signal being representative of the presence of RF signal transmissions associated with mobile cellular telephone service from the cellular phone, the output signal being supplied to the data processing means.

7. The monitoring apparatus as set forth in claim 5 wherein said data processing means generates statistical information indicating current cost associated with cellular telephone usage for a preselected time interval.

8. The monitoring apparatus as set forth in claim 5 wherein said data processing means generates statistical information indicating total time available for RF signal transmissions free of charge in a preselected time interval.

9. The monitoring apparatus as set forth in claim 5 wherein the cellular phone provides analog cellular mobile telephone services.

10. The monitoring apparatus as set forth in claim 5 wherein the cellular phone provides digital cellular mobile telephone services.

11. The monitoring apparatus as set forth in claim 5 wherein said detection means is disposed in close proximity to the antenna associated with the cellular telephone.

12. The monitoring apparatus as set forth in claim 11 wherein said data processing means is located in close proximity to said detection means.

13. The monitoring apparatus as set forth in claim 11 wherein the antenna associated with the cellular telephone is disposed at a remote location in relation to the cellular telephone.

14. The monitoring apparatus as set forth in claim 13 wherein said data processing means is disposed in close proximity to the cellular telephone at a remote location in relation to said detection means.

15. A wireless monitoring device for monitoring when a cellular telephone is used for mobile cellular telephone service, comprising:
- a radio frequency (RF) detection circuit including a broadband antenna coupled to an antenna associated with the cellular telephone for detecting RF signal transmission from the cellular telephone antenna, and generating an analog output voltage proportional to transmitted RF signals;
- a microprocessor for controlling the operation of said monitoring device and processing data indicative of the usage of the cellular telephone, said microprocessor including call processing means for determining whether the cellular telephone is in use and time tracking means for monitoring duration and timing of the telephone call, said microprocessor generating at least one digital output signal;
- a digital to analog (D/A) converter responsive to the digital output signal generated by said microprocessor, said D/A converter generating an analog reference voltage proportional to the digital output signal generated by the microprocessor having a threshold voltage level at or above which the voltage level of the output voltage generated by said RF detection circuit must be maintained for said monitoring device to consider the cellular telephone to be in use;
- an analog comparator having a first input coupled to the output voltage generated by said RF detection circuit and a second input coupled to the analog reference signal generated by said D/A converter, said comparator generating a digital output signal maintained in a first state when the first input is less than the second input and maintained in a second state when the first input is greater than or equal to the second input, the output signal generated by the comparator being supplied to said microprocessor;
- a clock coupled to said microprocessor for generating a clock pulse to provide for synchronization of functions performed by said microprocessor;
- a display unit for individually displaying a plurality of parameter values stored in the microprocessor corresponding to data processed by said microprocessor;
- first user actuated switching means connected to said microprocessor for incrementally varying displayed parameter values;
- second user actuated switching means connected to said microprocessor for advancing the displayed parameter values to the next parameter value stored in the microprocessor; and
- a power source for supplying power to said microprocessor.

16. The monitoring device as set forth in claim 15 wherein said call processing means is responsive to the state of the output signal generated by said analog comparator, said call processing means activating said time tracking means when the output signal is maintained in the second state for a period of time exceeding a first predetermined delay period, said call processing means deactivating the time tracking means when said output signal returns to the first state for a period of time exceeding a second predetermined delay period.

17. The monitoring device as set forth in claim 16 wherein the call processing means increases the minimum threshold level of the reference voltage generated by said microprocessor when the output signal of said comparator is maintained in the second state.

18. The monitoring device as set forth in claim 17 wherein the call processing means determines the number of times the presence of RF signal transmissions is detected by said RF detection circuit, and generates a message signal when a predetermined number of RF signal transmissions is detected.

19. The monitoring device as set forth in claim 18 wherein the call processing means triggers the first delay period after the predetermined number of RF signal transmissions is detected.

20. The monitoring device as set forth in claim 16 wherein the call processing means decreases the minimum threshold level of the reference voltage generated by said microprocessor when the presence of RF signal transmission is detected by the RF detection circuit after the expiration of the first delay period.

21. The monitoring device as set forth in claim 20 wherein the call processing means triggers the second delay period when no RF signal transmission is detected by said RF detection circuit after the expiration of the first delay period.

22. The monitoring device as set forth in claim 21 wherein the call processing means increases the minimum threshold level of the reference voltage generated by said microprocessor when the absence of RF signal transmission is detected by the RF detection circuit for a period of time greater than the second delay period.

23. The monitoring device as set forth in claim 16 wherein the time tracking means determines cumulative connect time the cellular telephone is used for mobile cellular telephone service during a predetermined time interval.

24. The monitoring device as set forth in claim 23 wherein the time tracking means determines cumulative time the cellular telephone is used for mobile cellular telephone service during peak billing hours for the predetermined time interval.

25. The monitoring device as set forth in claim 24 wherein the time tracking means determines cumulative time the cellular telephone is used for mobile cellular telephone service during off-peak billing hours for the predetermined time interval.

26. The monitoring device as set forth in claim 25 wherein the time tracking means determines cumulative cost for the total time the cellular telephone is used for mobile cellular telephone service during peak hours and off-peak hours for the predetermined time interval based upon billing rates associated with connect time, peak time and off-peak time.

27. The monitoring device as set forth in claim 23 wherein the predetermined time interval corresponds to a monthly billing period.

28. The monitoring device as set forth in claim 16 wherein the time tracking means monitors and updates current time of day, day of a week, day of a month, month and year.

29. The monitoring device as set forth in claim 16 wherein the time tracking means determines current total time available for cellular telephone use free of charge during peak billing hours for a predetermined time interval, and determines current total time available for cellular telephone use free of charge during off-peak billing hours for the predetermined time interval.

30. The monitoring device as set forth in claim 29 further including a visual alarm controlled by said microprocessor, said microprocessor activating said alarm when no time is available free of charge during peak billing hours, and when no time is available free of charge during off-peak billing hours.

31. The monitoring device as set forth in claim 29 further including an audible alarm controlled by said microprocessor, said microprocessor activating said alarm when no time is available free of charge during peak billing hours, and when no time is available free of charge during off-peak billing hours.

32. The monitoring device as set forth in claim 15 further including means for preventing unauthorized variation of displayed parameter values via said first user actuated switching device.

33. The monitoring device as set forth in claim 15 wherein said power source is at least one button cell battery.

34. The monitoring device as set forth in claim 33 further including energy storage means connected in parallel with the battery to provide power to the microprocessor during battery failure and replacement.

35. A method for monitoring the duration and timing of radio frequency (RF) signal transmissions from a cellular phone indicative of the presence of a cellular telephone call, comprising the steps of:

manually setting a plurality of parameter values associated with statistical information indicative of a customer billing plan;

detecting the presence of RF signal transmissions from a cellular telephone antenna;

generating a first signal representative of RF signal transmissions;

generating a variable reference signal having a minimum threshold voltage level;

determining whether the first signal is maintained at a voltage level greater than or equal to the minimum threshold voltage level for a first predetermined time interval;

triggering a second predetermined time interval when the first signal is maintained at the voltage level greater than or equal to the minimum threshold voltage level for the first predetermined time interval;

establishing the presence of a telephone call from the cellular telephone when RF signal transmissions are detected after the expiration of the second time interval;

monitoring the duration and timing of the cellular telephone call;

generating statistical information indicative of usage of the cellular telephone based upon the manually set parameter values and the duration and timing of all telephone calls made from the cellular telephone during a predetermined time interval;

displaying statistical information on a visual display;

triggering a third predetermined time interval when RF signal transmissions are not detected after the expiration of the second time interval;

continuing to monitor the duration and timing of the cellular telephone call when RF signal transmissions are detected after the expiration of the third time interval; and terminating the telephone call when RF signal transmissions are not detected after the expiration of the third time interval.

36. The method for monitoring a cellular telephone call as set forth in claim 35 wherein the step of manually setting parameter values associated with statistical information indicative of the customer billing plan includes the steps of:

manually setting the current day of the week, day of the month, month and year;

manually setting the current time of day;

manually setting a start date and a stop date for a user-defined billing period;

manually setting a start time of the day and a stop time of the day for a first daily time interval;

manually setting a start day of the week and a stop day of the week for the first time interval;

manually setting a billing rate per minute for mobile cellular telephone service provided during the first time interval;

manually setting the amount of time in the first time interval for which mobile cellular telephone service is available free of charge;

manually setting a start time of the day and a stop time of the day for a second daily time interval;

manually setting a start day of the week and a stop day of the week for the second time interval;

manually setting a billing rate per minute for mobile cellular telephone service provided during the second time interval;

manually setting the amount of time in the second time interval for which mobile cellular telephone service is available free of charge; and manually setting the billing rate per minute for connection time associated with mobile cellular telephone service provided during the first and second time intervals.

37. The method of monitoring the duration and timing of a cellular telephone call as set forth in claim 35, further including the steps of:

determining the current total time the cellular telephone is in use during the billing period for a first daily time interval having a first billing rate;

determining the current total time the cellular telephone is in use during the billing period for a second daily time interval having a second billing rate;

maintaining calendar information indicating the current day of the week, day of the month, month and year;

tracking the current time of day;

determining the current total cost for total time used in the billing period based upon the first time period at the first billing rate, and the second time period at the second billing rate, and the total connection time at the connection rate;

determining an estimated total cost for the entire billing period based upon the rate of cellular telephone usage to date;

maintaining statistical information indicating total time used during the first time period for the immediately preceding billing period;

maintaining statistical information indicating total time used during the second time period for the immediately preceding billing period; and maintaining statistical information indicating total costs accrued during the immediately preceding billing period.

* * * * *